July 7, 1936.　　　　G. CLARK　　　　2,046,609
CONTAINER AND METHOD OF SEALING
Original Filed May 13, 1931
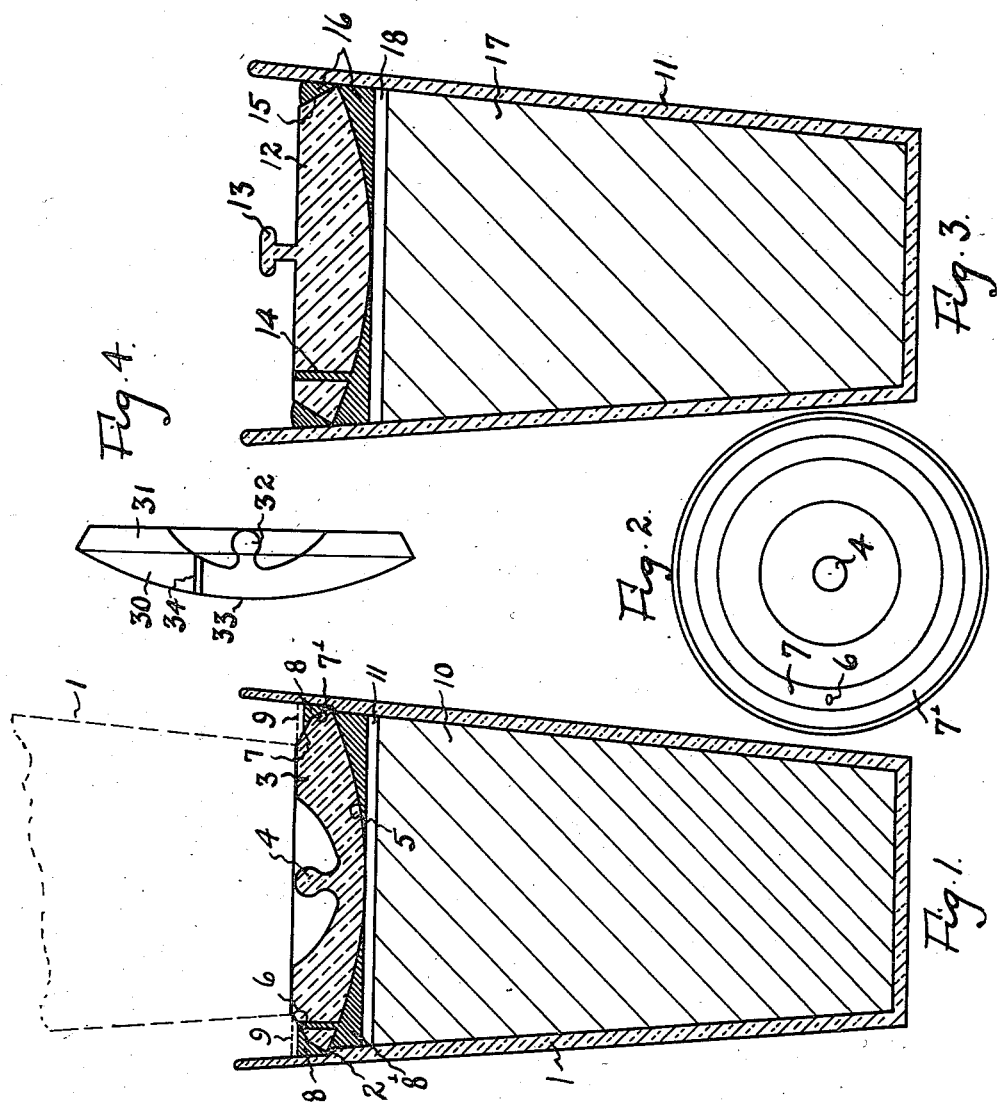
INVENTOR
Grover Clark
BY Darby & Darby
ATTORNEYS.

Patented July 7, 1936

2,046,609

UNITED STATES PATENT OFFICE 2,046,609

CONTAINER AND METHOD OF SEALING

Grover Clark, New York, N. Y.

Substitute for application Serial No. 537,077, May 13, 1931. This application October 23, 1935, Serial No. 46,386

7 Claims. (Cl. 99—181)

This invention relates in general to improvements in containers in which perishable products may be easily and rapidly sealed.

One of the objects of this invention is the provision of a novel form of container of any suitable shape, including a cover therefor, which may be hermetically sealed and securely held in place without the use of clamps, strips or rings of rubber or similar material, or any other special devices or materials except the sealing material to be described later.

A further object of this invention is the provision in a structure of this type of an arrangement whereby the finished container has a partial vacuum therein by reason of which the cover is held firmly in place by means of atmospheric pressure.

A still further object of this invention involves the use with such a container of a suitable sealing compound.

A still further object of this invention is to construct the container and cover so that the sealing compound hermetically seals the joint between the cover and container both on the outside of the cover and on the inside of the cover where exposed to the interior of the container.

A further object of this invention involves a novel process of sealing material into such a container.

Other objects of this invention, such as simplicity of construction, ruggedness, cheapness of manufacture, and the like, will be clearly apparent from the following disclosure.

This invention resides substantially in the combination, construction, arrangement, relative location of parts, steps, and series of steps, all as will be set forth in greater detail hereinafter.

Referring to the drawing—

Figure 1 is a vertical cross-sectional view through one form of container comprising this invention;

Fig. 2 is a top plan view of this form of the invention;

Fig. 3 is a vertical cross-sectional view through a modified form of container; and Fig. 4 is an enlarged elevational view of a modified form of cover for use with either container.

The invention will be more readily understood by detail reference to the drawing. The body 1 of the container is made of any suitable size, shape, and material. It may have any cross-sectional form and may be made of such materials, as glass, clay, pottery, porcelain, metal, and the like. The most important feature is that the main body of the container, particularly below the cover, should be of a non-porous material, or be made non-porous on the inside or outside by glazing or any other process, so that a vacuum may be maintained therein.

The container in Fig. 1 is shown with an annular, internal ledge 2 upon which the cover may rest. This ledge may be continuous or consist of a series of projections, or have any other form for supporting the cover at a suitable point. As shown in Fig. 1, the ledge 2 is placed sufficiently far down within the container so that other containers may be set on the top, as indicated in dotted lines, for stacking purposes. Of course the parts may be proportioned so that the bottom of one container will snugly fit into the top of the other.

The cover as shown at 3 and in the form in Fig. 1 has a central depression in which the handle 4 for the cover is provided. The lower surface of the cover is convex, as indicated at 5. The circumference of the cover is provided in the form shown in Fig. 1 with two beveled portions 7 and 7'. The general direction of these two beveled portions is inwardly from the edge. The cover is shown provided with a passage 6 extending all the way through and terminating in the bevel 7. If desired more than one of these passages may be provided.

In the modified container 11 of Fig. 3 no internal ledge or abutments are provided but the container is so shaped that the sides themselves will support the cover at the proper point as shown. In this case the cover 12 is provided with a single beveled edge 15, a convex under surface and a projecting handle 13. The passage 14 extends entirely through the cover and terminates on the top surface thereof as shown. The modified cover 31 of Fig. 4, which of course may be used with either form of container, is provided with a central recess in which the handle 32 is situated and has a convex lower surface 33. This gives the entire under surface 30 of the cover a spherical shape. In this case the passage 34 extends through the cover into the recess in which the handle lies. In the preferred form this opening 34 would be exposed in the recess at the lowest point thereof.

The shapes of cover and container, position of passage, shape of beveled edge of cover, etc., mentioned above may be combined in any way. The following are the general requirements for the formation of the container and cover: (1) the container may be round, oval, rectangular or any other shape; (2) the sides of the container may slope inwardly or outwardly or rise straight up from the bottom, or may be in any other form; (3) the container may be of any convenient dimensions; (4) the cover may be of any convenient size, thickness and shape, with any convenient form of handle, except that (a) the cover to be used with any particular container must be of such a form as to fit that container, and (b) the cover must have a convex under surface, a beveled edge with the bevel sloping toward the center of the cover and a hole, slot or other passage from the top through to the bottom; (5) the bevel on the edge of the cover may be at any convenient angle; (6) the passage through the cover may be at any convenient distance from the edge of the cover and may be of any convenient size or shape except that it may not be so large that the solidified sealing material in it (the method for filling this passage with solidified sealing material is described below) will be drawn down into the container when the vacuum is formed in the container (by the process described below).

The sealing material should have the physical characteristics of liquefying at a temperature lower than that of boiling water and solidifying at a temperature higher than ordinary air temperatures. In addition, it should be of such a nature as to expand slightly upon solidification. It has been found that paraffin is a suitable example of such a sealing material.

In sealing such a container the material to be sealed in the container, which is indicated generally at 10 in Fig. 1 and 17 in Fig. 3, is poured into the container preferably in a heated condition so as to fill the container to the point at which the cover rests. More accurately the upper surface of the material should be at such a point that when the cover is put in place it dips into the material and forces it up around the curved surface but before the cover is put in place it is preferable to shake or stir the material to remove as much of the air as possible. When the cover is put in place the convex under surface thereof forces a small portion of the material upwardly so as to cover the entire lower surface of the cover and expel the remaining air in the container. The sealing material, heated to a liquid condition, is indicated at 8 and 8' in Fig. 1. It is poured into the annular recess formed by the beveled edge of the cover, or onto the cover so that it runs into this annular recess and into the passage through the cover, filling the annular recess and the passage 6.

No special care is necessary in pouring the sealing material, except that enough of the sealing material should be used to allow for the drawing down of the sealing material into the container during the cooling process (as described below) and for a remainder sufficient substantially to fill the annular recess and the passage 6. The container, with cover and sealing material in place then is set aside to cool.

As the material in the container cools, it decreases in volume with the result that its surface falls. The heat of the contents of the container, directly and transmitted through the sides of the container and the cover, keeps the sealing material in a liquid state for a time so that the sealing material passes downward without difficulty through the passage 6 in the cover and around the edges of the cover, following the surface of the contents of the container as this surface falls. As the sealing material in a liquid state passes through the passage 6 and around the edges of the cover, it fills all the minor irregularities or holes which otherwise might permit the leakage of air past the cover. The position of the sealing material between the contents of the container and the outside air also effectively prevents contact between the air and the contents of the container after the cover has been properly put in place and the sealing material has been poured on.

Before the temperature of the container and its contents has fallen to the point at which the sealing material solidifies, the sealing material has moved into such a position that it lies in a layer under the cover and fills both the annular recess created by the beveled edge of the cover and the passage 6. In this position, the sealing material solidifies when the proper temperature is reached in the cooling process. The solidified sealing material completely surrounds the edges of the cover, substantially fills the passage 6, and forms a layer under all or practically all of the under surface of the cover, as indicated in 6, 8 and 8' in Fig. 1 and 14 and 16 in Fig. 3. The sealing material as it solidifies expands slightly, insuring the closing of all possible orifices and providing a hermetic seal. The solidified sealing material in the passage (6 in Fig. 1 and 14 in Fig. 3) provides an effective plug for this passage. After the sealing material has solidified, the further cooling of the contents of the container, down to normal air temperature, causes further contraction thereof so that when the contents of the container are fully cooled, a small space (11 in Fig. 1 and 18 in Fig. 2) remains between the upper surface of the contents of the container and the under surface of the sealing material and cover. Since no air can pass the solidified sealing material, the result is the formation of a vacuum in the container so that atmospheric pressure acts to hold the cover in place. The pressure of the sealing material against the sides of the container and the cover, due to its expansion upon solidification acts with the atmospheric pressure to hold the cover in place. Of course the parts must be so proportioned that sufficient sealing compound will be present in the annular groove to supply the portion 8' within the container.

In the arrangement of Fig. 3, or in using a cover of the type indicated in Fig. 4, the method of filling and sealing is substantially the same. In both cases the sealing compound is poured over the surface of the cover so as to submerge the upper end of the passage through the cover (14 in Fig. 3 and 34 in Fig. 4) and to fill the annular recess between the beveled edge of the cover and the sides of the container. If desired, the cover, in the form indicated in Fig. 3, may be given a slightly sloping surface from the center outward towards the edge so that the sealing material will be sure to run to the sides.

This container may also be used for canning and preserving cold materials. The procedure is substantially the same except that the material is filled into the container to a slightly lower level so that the sealing compound may be poured into the container through the passage of the cover to fill up the space between the cover and the top of the contents of the container. As the sealing material cools it expands slightly acting to lock the cover in place. In this case the cover is not held in place so firmly as when the contents of the jar are sealed while hot so that a vacuum is produced, but nevertheless it has been found that it is held sufficiently firm so as to prevent it becoming loose. In this case also it is well to expel as much of the air as possible by stirring and agitation before putting the cover in place.

The materials may be filled into the containers in a cold state and either uncooked or partially cooked, and then be completely cooked in the containers which would then be sealed while hot by the method disclosed. It is also within this invention to place the material completely cooked, although cool, into the containers and then heat it before cooling.

In view of the above disclosure it will be apparent that this invention resides in certain principles of construction and operation which may take other physical forms and be carried out in other ways without departure from these principles. I do not, therefore, desire to be strictly limited to the disclosure as given for purposes of illustration, but rather to the scope of the appended claims.

This application is a substitute for my application, Serial No. 537,077, filed May 13, 1931.

What I seek to secure by United States Letters Patent is:

1. An article as described comprising a container adapted to store materials, a closure for said container, means on the interior of the container for supporting the closure within the container and below the upper edge thereof, and a sealing compound enclosing the point of contact between the closure and container on both sides thereof.

2. An article of the type described comprising a container into which heated materials are to be placed, a closure for said container having a convex under surface and a beveled edge, said closure being supported below the upper edge of the container and having a passage therethrough, and a sealing compound on the groove formed between the container and the beveled edge thereof and in the passage and covering the under surface of the closure.

3. The method of sealing a container comprising a receptacle and a closure therefor having a beveled edge and a passage therethrough intersecting the beveled edge comprising filling the receptacle with the material to be sealed therein in heated condition to a predetermined level, placing the closure on the container so as to effect contact therebetween with the entire surface of the material, pouring a heated sealing compound into the groove formed between the container and the beveled edge of the closure and permitting the sealing compound to pass through the passage in the closure and past the edges of the closure to coat the entire under surface of the closure as the contents of the container cools.

4. The method of sealing a container comprising a receptacle and a closure therefor having a beveled edge and a passage therethrough intersecting the beveled edge comprising filling the receptacle with the material to be sealed therein in heated condition to a predetermined level, placing the closure on the container so as to effect contact therebetween with the entire surface of the material, agitating the contents of the container to expel the air therefrom, pouring a heated sealing compound into the groove formed between the container and the beveled edge of the closure and permitting the sealing compound to pass through the opening in the closure and past the edges of the closure to coat the entire under surface of the closure as the contents of the container cools.

5. The method of sealing comprising providing a container and a closure therefor having a convex under surface, a beveled edge and a passage extending therethrough comprising filling material into the container in heated condition, placing the closure in the top of the container so that its convex surface engages the top of the material and forces it up to contact with the entire under surface of the container, pouring a heated sealing compound into the annular groove between the container and the beveled edge of the closure to submerge the passage therethrough, permitting the sealing compound to pass through the passage and past the edges of the closure to coat the under surface of the closure, and cooling the contents of the container and the sealing material to create a vacuum in the container.

6. The method of sealing containers having closures with passages therethrough, beveled edges and convex under surfaces which comprises filling the material to be sealed into a container in a heated condition and approximately to a predetermined level, securing direct contact between the sealing compound and the material so that no air can come in contact with the material after sealing by placing the closure in the top of the container at such a level that its convex under surface engages the top of the material and forces it up to contact with the entire under surface of the container, sealing the container with a compound which is in a liquid state when heated, and by the use of said containers and closures and of the cooling of the contents of the container.

7. The method of sealing containers having closures provided with passages therethrough, convex under surfaces and beveled edges which comprises filling the material to be sealed into a container in a heated condition approximately to a predetermined level, expelling air from the material by agitation, expelling air from inside the container below the under surface of the closure by placing the closure in the top of the container at such a level that its convex under surface engages the top of the material and forces it up to contact with the entire under surface of the closure, pouring a heated liquid sealing compound onto the closure when it is in position, to secure direct contact between the sealing compound and the material and an airtight barrier between the air and the material by permitting the sealing compound to flow through the passage in the closure and into the groove between the container and the beveled edge of the cover until it rests in direct contact with the material to be sealed, closing all passages or holes through the cover and filling all irregularities in the adjacent surfaces of the container and of the closure and forming a coating of the sealing compound around the closure and completely filling all possible spaces or openings between the closure and the sides of the container, said sealing compound being liquid when hot and solid when cold, and cooling the sealing material to fasten it in position to insure a hermetic seal and to secure the closure firmly in position.

GROVER CLARK.